Figure 1:
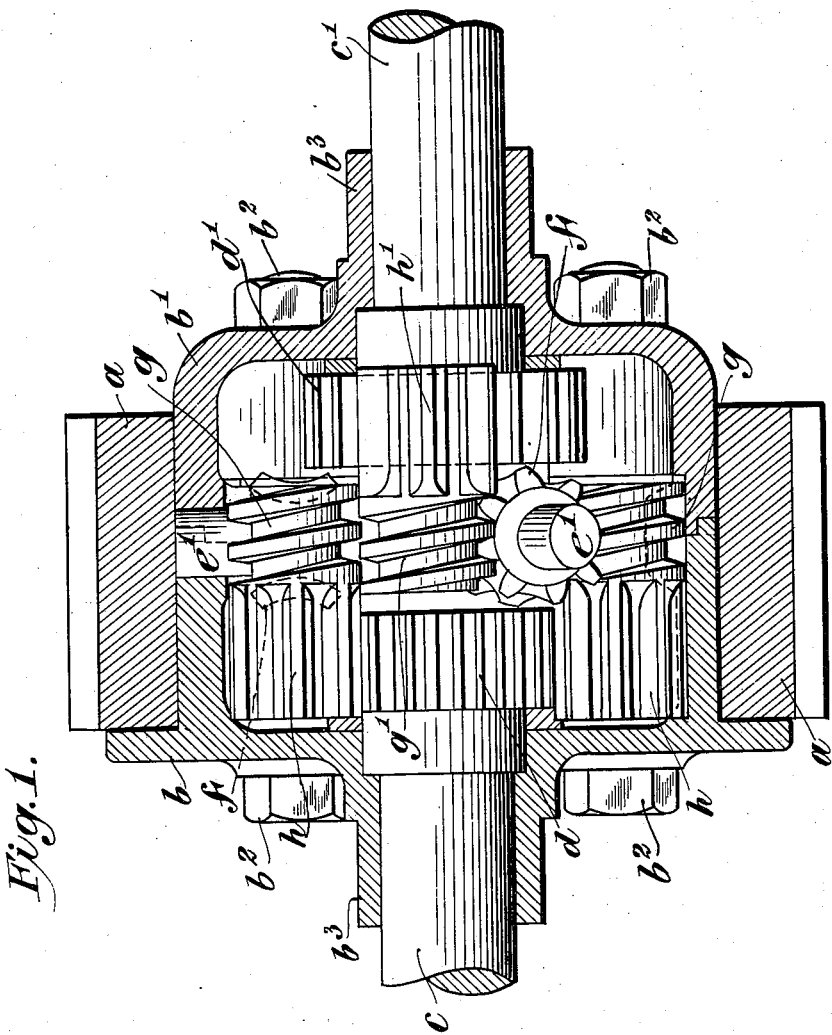

E. L. & M. WALTER.
DIFFERENTIAL GEARING FOR MOTOR VEHICLES.
APPLICATION FILED APR. 20, 1914.

1,164,769.

Patented Dec. 21, 1915.
2 SHEETS—SHEET 1.

WITNESSES

INVENTORS
Edward Louis Walter
and Maurice Walter
BY
Redding, Greeley & Goodlett
ATTORNEYS

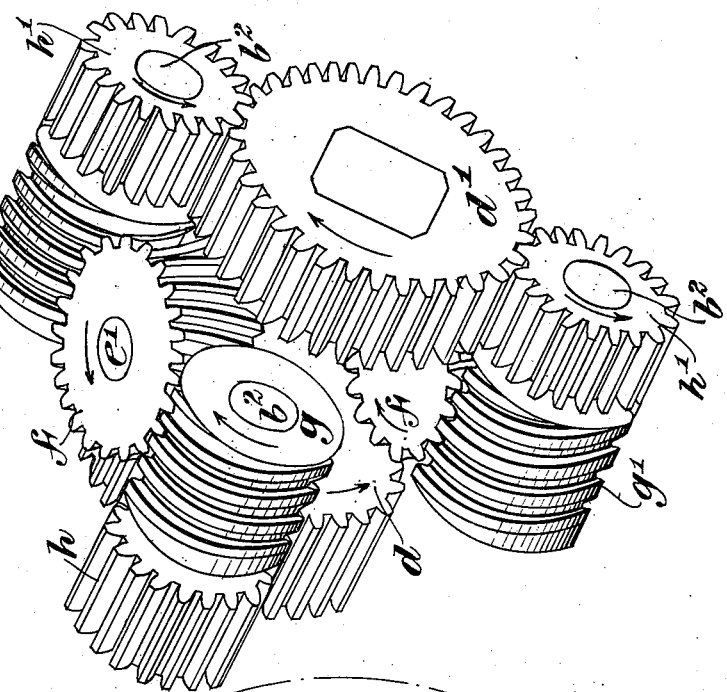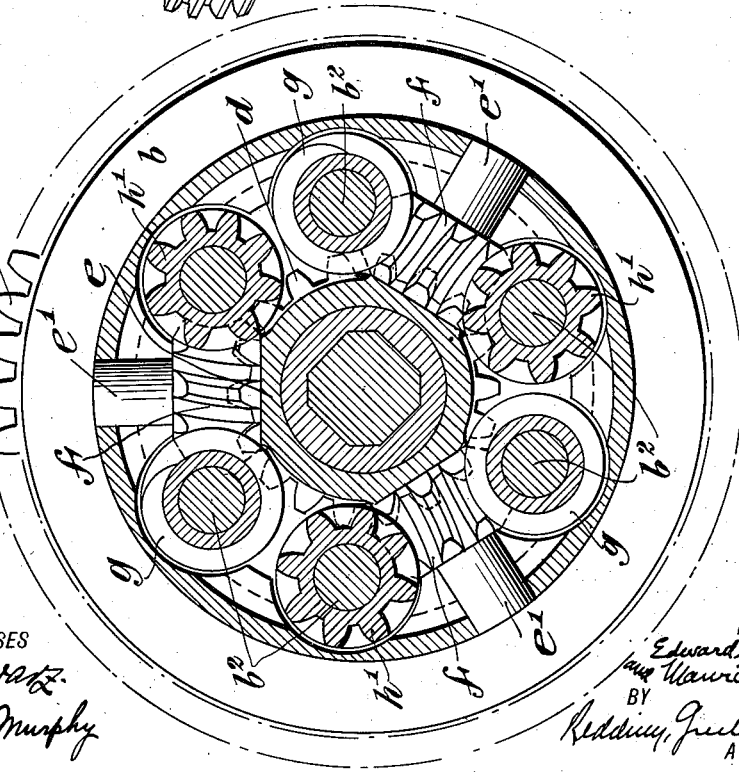

UNITED STATES PATENT OFFICE.

EDWARD LOUIS WALTER AND MAURICE WALTER, OF NEW YORK, N. Y.; SAID EDWARD LOUIS WALTER ASSIGNOR OF TWO-FIFTHS OF THE WHOLE RIGHT TO HARRY A. CHADWICK, OF MOBERLY, MISSOURI.

DIFFERENTIAL GEARING FOR MOTOR-VEHICLES.

1,164,769.   Specification of Letters Patent.   Patented Dec. 21, 1915.

Application filed April 20, 1914. Serial No. 833,092.

*To all whom it may concern:*

Be it known that we, EDWARD LOUIS WALTER and MAURICE WALTER, both citizens of the United States, and both residing in the borough of Manhattan of the city of New York, in the county of New York, in the State of New York, have invented certain new and useful Improvements in Differential Gearing for Motor-Vehicles, of which the following is a specification, reference being had to the accompanying drawings, which form a part hereof.

This invention relates to differential gearing through which power is transmitted from the engine shaft to the driving wheels of a motor vehicle. The general purposes and operation of such gearing are well understood and require no particular description herein.

The special objects in view, in the present case, are to prevent the loss of power due to the racing or spinning of a vehicle wheel, when it is clear of the ground, which occurs in driving through a spur-gear or bevel gear differential; to secure positive driving of at least one wheel under all conditions, even if the shaft of the other wheel is broken; to secure an equal application of power to both wheels under all conditions, without depending upon friction for irreversibility, while permitting a change in the relative speed of the two wheels under conditions which require it, as when the vehicle deviates from a straight line; and to permit the use of the motor as a brake, which is not possible with some forms of differential gearing, such as the ratchet differential gearing. The improved gearing, by which these desirable results are accomplished, comprises two driven members, which may be ordinary spur-gears, a single driving member, and driving connections between the driving member and the driven members which include pairs of worms severally in operative connection with the driven members and in operative connection each with a common worm gear mounted on a radial axis but eccentrically with respect to the housing.

The invention will be more fully explained hereinafter with reference to the accompanying drawings in which a suitable embodiment thereof is illustrated and in which—

Figure 1 is a view partly in longitudinal section and partly in elevation of a differential gearing which embodies the invention. Fig. 2 is a view of the same in transverse section and Fig. 3 is an isometric projection of the driven members, worms and worm gears, with the intermediate pinions.

The master gear $a$ through which power is transmitted from any suitable source to the differential gearing, is shown as secured upon the step-jointed housing $b\ b'$, the parts of which are secured together by bolts $b^2$ (which support the worms hereinafter referred to), and are formed with bearings $b^3$ which receive the independent driven shafts $c\ c'$. The latter are squared or otherwise suitably formed to receive, within the housing $b\ b'$, the driven members $d\ d'$, which are shown as spur-gears but may have any suitable form of teeth. In the construction shown a triple armed spider $e\ e'$ is supported by the two-part housing $b\ b'$ and furnishes bearings for the common worm gears $f$ which are mounted on radial axes but eccentrically with respect to the housing. The two worms $g\ g'$ of each pair which are mounted on the bolts $b^2$ mesh with each common gear $f$. Each worm $g$ carries a pinion $h$ which meshes with the corresponding driven member $d$ and each worm $g'$ carries a pinion $h'$ which meshes with the corresponding driven member $d'$. It will be seen that under all ordinary conditions of operation the two worms $g$ and $g'$ of each pair act oppositely upon the common worm gear $f$ and that each tends to resist motion of the worm gear which the other may tend to produce.

In the operation of the improved differential gearing it will be seen that as the worm gears $f$ are carried with the housing and act through the opposite worms $g$ and $g'$ and their pinions $h$ and $h'$ upon the driven members $d$ and $d'$, both driven members will be rotated together, at the same speed, and with equal power, the whole differential rotating as a solid part. If only one driven member offers resistance, as when the other shaft is broken, the tendency will be to cause rotation of the corresponding worm and rotation of the worm gear $f$ in mesh therewith, but such tendency of the worm gear $f$ to rotate will be resisted by the other worm in mesh therewith, so that the differential gear will then also rotate as a solid part. If, however, the vehicle deviates from a straight line, so that one wheel must turn relatively faster and the other relatively slower the two worms of each pair will tend to produce rotation of the common worm gear $f$ in the same direction and equal power will therefore be transmitted to the two driven members $d$ and $d'$ but at different speeds, the pinions $h$ and $b'$ then rotating on their own axes and traveling around the driven members $d$ and $d'$ at different rates.

It will be evident that the operation of the improved gearing depends upon the irreversibility of a worm gear, that is, of the inability of such a worm gear to transmit rotation to a worm of slight lead, and that the operation does not depend upon excessive friction, as would be the case if spiral gears were employed. It will also be observed that the employment of worms and worm gears necessitates an arrangement of parts different from that which the employment of spiral gears would necessitate. It will also be understood that one or any number of pairs of worms may be employed and that the character and relative arrangement of the driven members and their coöperating pinions may be varied to suit different conditions of use.

We claim as our invention:—

1. In a differential gearing, a rotatable housing, two driven gears, a worm gear mounted eccentrically within the housing with its axis radial, two worms mounted in the housing with their axes parallel with the axis of the housing and both meshing with the worm gear, and gears carried by the worms and in engagement with the driven gears respectively.

2. In a differential gearing, a rotatable housing, two driven gears, a plurality of worm gears mounted eccentrically within the casing with their axes radial, several pair of worms mounted in the housing with their axes parallel with the axis of the housing and both worms of a pair meshing with the same worm gear, and gears carried by the worms and in engagement with the driven gears respectively.

3. In a differential gearing, a rotatable housing, two driven gears, a spider carried with the housing, a worm gear mounted eccentrically on the spider with its axis radial, two worms mounted in the housing with their axes parallel with the axis of the with their axes parallel with the axis of the housing and both meshing with the worm gear, and gears carried by the worms and in engagement with the driven gears respectively.

4. In differential gearing, the combination of divided axle sections, a spider, worm gears carried by said spider and journaled on axes radial to the axle, and worm shafts geared to the axle sections and to said worm gears.

5. In differential gearing, the combination of divided axle sections, a spider, worm gears carried by said spider and journaled on axes radial to the axle, shafts arranged at opposite sides of each worm gear and geared to the axle sections, and worms on said shafts in driving engagement with said worm gear.

6. In differential gearing for motor vehicles, the combination with the sections of a divided axle, of a spur gear fast on each of said axle sections, a spider having a plurality of stud shafts radiating therefrom, a worm gear journaled on each of said stud shafts, worm shafts at opposite sides of each worm gear meshing with the latter, and a spur gear on each of said worm shafts one meshing with the spur gear on one axle section and the other meshing with the spur gear on the other axle section.

This specification signed and witnessed this 17th day of April A. D., 1914.

EDWARD LOUIS WALTER.
MAURICE WALTER.

Signed in the presence of—
  WALTER H. BEARDSLEE,
  GUSTANES REHALM.